(12) United States Patent
Schnabel

(10) Patent No.: US 11,843,140 B2
(45) Date of Patent: Dec. 12, 2023

(54) FUEL CELL SYSTEM AND METHOD FOR REMOVING WATER FROM THE FUEL CELL SYSTEM

(71) Applicant: AVL List GmbH, Graz (AT)

(72) Inventor: Alexander Schnabel, Graz (AT)

(73) Assignee: AVL List GmbH, Graz (AT)

(*) Notice: Subject to any disclaimer, the term of this patent is extended or adjusted under 35 U.S.C. 154(b) by 150 days.

(21) Appl. No.: 17/608,166

(22) PCT Filed: May 8, 2020

(86) PCT No.: PCT/AT2020/060188
§ 371 (c)(1),
(2) Date: Nov. 2, 2021

(87) PCT Pub. No.: WO2020/223754
PCT Pub. Date: Nov. 12, 2020

(65) Prior Publication Data
US 2022/0320537 A1    Oct. 6, 2022

(30) Foreign Application Priority Data

May 9, 2019    (AT) .............. A 50417/2019

(51) Int. Cl.
*H01M 8/04119*    (2016.01)
*H01M 8/043*    (2016.01)
(Continued)

(52) U.S. Cl.
CPC ....... *H01M 8/04179* (2013.01); *H01M 8/043* (2016.02); *H01M 8/04253* (2013.01); *H01M 8/04761* (2013.01); *H01M 8/04843* (2013.01)

(58) Field of Classification Search
CPC ............. H01M 8/04179; H01M 8/043; H01M 8/04253; H01M 8/04761; H01M 8/04843
See application file for complete search history.

(56) References Cited

U.S. PATENT DOCUMENTS

2002/0142197 A1    10/2002   Kato et al.
2009/0011302 A1    1/2009    Hamada
(Continued)

FOREIGN PATENT DOCUMENTS

CN    109830709 A    * 5/2019
DE    102017209181 A1 * 12/2018
(Continued)

OTHER PUBLICATIONS

Internationaler Recherchenbericht und Schriftlicher Bescheid [International Search Report and the Written Opinion] dated Jul. 21, 2020 From the International Searching Authority Re. Application No. PCT/AT2020/060188 and Its Translation of Search Report Into English. (13 Pages).

*Primary Examiner* — Amanda C. Walke

(57) ABSTRACT

The invention relates to a method for removing water from a fuel cell system (1) comprising a fuel cell stack (2) having an anode portion (3) and a cathode portion (4), a purge valve (5) downstream of the anode portion (3) for controlling a purge pressure in the anode portion (3), and a back pressure valve (6) downstream of the cathode portion (4) for controlling a back pressure in the cathode portion (4), comprising the steps: increasing the purge pressure in the anode portion (3) to a predefined purge pressure setpoint (AP1) with the purge valve (5) closed, increasing the back pressure in the cathode portion (4) to a predefined back pressure setpoint (KP1) with the back pressure valve (6) closed, and subsequently reducing the increased purge pressure as well as the increased back pressure in pulses by opening the purge valve (5) and the back pressure valve (6). Furthermore, the invention relates to a fuel cell system (1) and a computer program product (10) for carrying out a method according to the invention, as well as a storage means comprising a computer program product (10) stored thereon.

10 Claims, 2 Drawing Sheets

Figure 1:
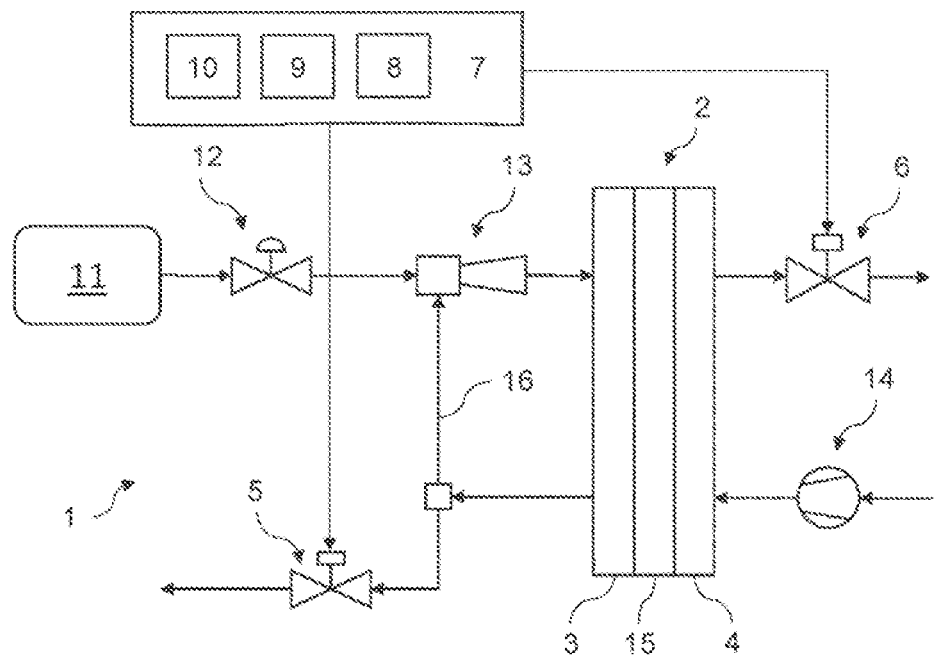

(51) Int. Cl.
    *H01M 8/04223*    (2016.01)
    *H01M 8/04746*    (2016.01)
    *H01M 8/04828*    (2016.01)

(56) References Cited

U.S. PATENT DOCUMENTS

| | | | |
|---|---|---|---|
| 2009/0226783 A1 | 9/2009 | Hasegawa | |
| 2015/0295255 A1* | 10/2015 | Bae | H01M 8/04231 |
| | | | 429/446 |
| 2016/0141660 A1* | 5/2016 | Yamamoto | H01M 8/04179 |
| | | | 429/415 |

FOREIGN PATENT DOCUMENTS

| | | | | |
|---|---|---|---|---|
| EP | 2824742 | | 1/2015 | |
| EP | 3021405 A1 | * | 5/2016 | ............ B60L 1/003 |
| GB | 2534138 A | * | 7/2016 | ........ H01M 8/04097 |
| JP | 2014089813 A | * | 5/2014 | |
| WO | WO 2017/089466 | | 6/2017 | |

* cited by examiner

FUEL CELL SYSTEM AND METHOD FOR REMOVING WATER FROM THE FUEL CELL SYSTEM

RELATED APPLICATIONS

This application is a National Phase of PCT Patent Application No. PCT/AT2020/060188 having International filing date of May 8, 2020, which claims the benefit of priority of Austrian Patent Application No. A 50417/2019 filed on May 9, 2019. The contents of the above applications are all incorporated by reference as if fully set forth herein in their entirety.

The present invention relates to a fuel cell system as well as a method for removing water from the fuel cell system. Furthermore, the invention relates to a computer program product for carrying out a purging process in a fuel cell system as well as a storage means with a computer program product stored thereon.

Various methods for removing water from a fuel cell system are known in the prior art. The removal of water is usually carried out in the course of a purging process in which pipe sections of the fuel cell system are purged with the aid of at least one purging fluid and thus freed of water residues. Such purging processes can be performed during a dedicated purging and drying mode and/or during an electricity-generating mode of the fuel cell system.

The international patent application WO 2017/089466 A1 discloses a method for purging a fuel cell system during an electricity-generating mode of the fuel cell system. More specifically, a purging chamber for purging the fuel cell system on an anode side and/or a cathode side is described. If the fuel cell system is used as an electrolyser, the cathode side can be purged. If the fuel cell system is used for generating electricity, the anode side can be purged.

Purging processes during the purging and drying mode are in particular carried out to avoid icing in the fuel cell system as well as to prepare for a start process of the fuel cell system, as remaining water in the fuel cell system can cause system damage and problems when starting the fuel cell system, especially during a cold start. Such processes are in particular provided for a cold start, which means this can be part of a cold stop procedure. On the anode side, the purging and drying is usually carried out by a hydrogen gas with opened purge valve. In contrast, a purging and drying process on the cathode side is carried out using air. For this purpose, the cathode side is usually supplied with a high air flow with low humidity at low air pressure. Often, the purging and drying process is carried out until a significant drop in a high-frequency membrane resistance (HFR) is detectable. On the one hand, this requires appropriate measurement technology, on the other hand, measurement errors can lead to unwanted dehydration of the membrane. In the event of excessive drying, a mechanical stress can build up on the electrolyte membrane which can lead to a shortened service life of the membrane. It is therefore desirable to minimise dehydration of the electrolyte membrane and accelerate an overall drying process.

The object of the present invention is to take into account, at least partially, the problem described above. In particular, it is the object of the present invention to provide a fuel cell system as well as a method for the accelerated and/or effective removal of water from the fuel cell system. In addition, it is an object to create a computer program product to carry out such a method as well as a storage means on which such a computer program product is stored.

The above object is achieved by the patent claims. In particular, the above object is achieved by the method according to claim 1, the fuel cell system according to claim 7, the computer program product according to claim 9 as well as the storage means according to claim 10. Further advantages of the invention arise from the dependent claims, the description and the drawings. Naturally, features and details which are described in connection with the method also apply in connection with the fuel cell system according to the invention, the computer program product according to the invention, the storage means according to the invention and in each case vice versa, so that with regard to the disclosure, mutual reference is or can always be made to the individual aspects of the invention.

According to a first aspect of the present invention, a method for removing water from a fuel cell system is provided, wherein the fuel cell system comprises a fuel cell stack with an anode portion and a cathode portion, a purge valve downstream of the anode portion for controlling a purge pressure in the anode portion as well as a back pressure valve downstream of the cathode portion for controlling a back pressure in the cathode portion. The method comprises the following steps:

a) increasing the purge pressure in the anode portion to a predefined purge pressure setpoint,
b) increasing the back pressure in the cathode portion to a predefined back pressure setpoint and subsequently
c) reducing the increased purge pressure as well the increased back pressure in pulses by opening the purge valve and the back pressure valve.

That is to say, according to the invention, the volumes in and around the fuel cell stack in the fuel cell system are first pressurised through the respective pressure increase and then abruptly depressurised through a common valve opening. In conventional purging and/or drying methods, a relatively constant stoichiometric pressure is present in the volumes in question, or the pressure only changes relatively slowly even in pulsed purging processes. Pulsed purging processes are for example generated by a compressor (air supply) or a pressure valve (hydrogen supply). The approach according to the invention leads to an abrupt depressurisation, i.e. a (negative) pressure pulse can be generated, which leads to significantly higher flow velocities and corresponding maximum shear forces than was previously possible or efficiently achievable. As a result, water, especially in liquid form, which is present in various pipe sections and/or in functional components such as a humidifier, butterfly valves and/or outlet valves of the fuel cell system, can be effectively transported from there into the environment of the fuel cell system. In this way, the time required for drying and/or purging the fuel cell system can be significantly shortened.

Optionally, a drain valve can be opened on an anode side at the same time the purge valve and the back pressure valve are opened according to step c). This makes it possible to achieve an even faster depressurisation, whereby it is important not to exceed a maximum hydrogen emission during the purging process.

The procedure according to the invention corresponds to an "inflation" or pressurisation and depressurisation of the volumes contained in the system. For example, in the case of a PEM system in the automotive field, the cathode path from a compressor to the back pressure valve can contain more than 5 litres of air volume. The compressed air can contain a correspondingly great deal of energy. The purging or drying process according to the invention is thus achieved less through inflowing fluids than through the sudden depressurisation of the system. As a result, the energy stored in the fluid pressure can, within a short time, be converted into a purging pulse with temporarily high air velocities, allowing water to be removed from the fuel cell system effectively and quickly.

The desired pressure increase can be carried out by at least one compressor of the fuel cell system. This can be realised at a minimum load point or at another low load point of the fuel cell system. A conventional drying process can then be carried out.

The purge pressure setpoint can correspond to a nominal system pressure or operating pressure or a corresponding operating pressure value with which the fuel cell system is operated in order to generate electricity. That is to say, the purge pressure and/or the back pressure can be increased to the nominal operating pressure or substantially to the nominal operating pressure.

The method is preferably carried out in a fuel cell vehicle, in particular after parking the fuel cell vehicle which contains the fuel cell system. This prevents harmful ice from forming in the fuel cell system at an ambient temperature of below 0° C. which can impair the function of various components of the fuel cell system.

The purge valve may be arranged immediately downstream of the anode portion. Likewise, the back pressure valve can be arranged directly downstream of the cathode portion. Nevertheless, it is possible that further functional components, in particular further valve units, are arranged in a flow direction between the respective electrode section and the purge valve or the back pressure valve. It is favourable if the valves which are present in any case are used for the purging process on the anode side.

As already described above, a pulsed reduction in the increased pressures can be understood to mean an abrupt reduction which is triggered by the opening of the purge valve as well as the back pressure valve. The closing of a valve or a closed valve can be understood to refer to a valve in a blocking position in which a fluid flow through a fluid line in which the valve is located is prevented or substantially prevented. The opening of a valve or an opened valve can be understood to refer to a valve in an open position in which a fluid flow through a fluid line in which the valve is located is made possible or in which the fluid line is opened for a fluid flow, at least in the region of the respective valve.

The steps a) and b) are preferably carried out simultaneously or substantially simultaneously. This prevents stresses in an electrolyte membrane between the anode portion and the cathode portion. For the same reason, the purge valve and the back pressure valve are likewise also preferably opened simultaneously or substantially simultaneously in order to reduce the increased purge pressure as well as the increased back pressure.

According to a further embodiment of the present invention, it is possible that, in a method for removing water from the fuel cell system, the steps a), b) and c) are carried out several times in succession. That is to say, the volumes in and around the anode portion as well as in and around the cathode portion are pressurised and depressurised at regular intervals. This allows the water to be removed particularly effectively from the fuel cell system. In experiments carried out in connection with the present invention it has been found, surprisingly, that this procedure does not present a risk of damage to functional components of the fuel cell system. Rather, due to the high pulse intensity of the process fluids used, water can be purged from the fuel cell system quickly, reliably and in a component-friendly manner.

Furthermore, it is possible that in a method according to the invention the purge pressure in the anode portion is increased to a maximum permitted or approximately maximum permitted purge pressure in the anode portion and the back pressure in the cathode portion is increased to the maximum permitted or approximately maximum permitted back pressure in the cathode portion. Thus, a correspondingly high value for the impulse of the fluid pulse for purging or drying the fuel cell system can be achieved at which no damage or destruction of the fuel cell system need be feared. Increasing the purge pressure in the anode portion to the maximum permitted or approximately maximum permitted purge pressure in the anode portion can be understood to mean that the purge pressure is increased to a maximum purge pressure value which corresponds to a maximum permitted system pressure or operating pressure in the anode portion while generating electricity. Increasing the back pressure in the cathode portion to the maximum permitted or approximately maximum permitted back pressure in the anode portion can be understood to mean that the back pressure is increased to a maximum back pressure value which corresponds to a maximum permitted system pressure or operating pressure in the cathode portion while generating electricity.

According to a further variant embodiment of the present invention, it is possible that, in a method, the purge pressure in the anode portion and the back pressure in the cathode portion are in each case increased to a value between 2 bar and 5 bar. In experiments carried out in connection with the present invention, this value or these values have proven to be particularly suitable in order to realise an effective and yet component-friendly purging process. However, the pressures can also be higher or lower. It can be of further advantage if, in a method according to the invention, the purge pressure in the anode portion and the back pressure in the cathode portion are increased to the same or approximately the same value. This allows the method to be carried out in a particularly membrane-friendly manner. In particular, it must be ensured that the back pressure and the purge pressure are always kept the same or substantially the same during the increase to the respective setpoint pressure or the maximum pressure, or that no large difference exists. However, for reasons of maximum hydrogen emissions in the exhaust gas path (usually less than 8 percent by volume), it may also be necessary to allow the cathode pressure to be relieved faster than the anode pressure. This is advantageous in particular if the purge valves have smaller opening cross-sections than the back pressure valve on the cathode side.

In practice, it has also proved to be advantageous if the desired back pressure or a corresponding cathode pressure is set by a compressor with the back pressure valve closed and the purge pressure or a corresponding anode pressure is adapted to follow the back pressure. For safety reasons, care can be taken to ensure that the purge pressure, for example in the form of a hydrogen pressure, is always set or regulated to be minimally higher in the anode portion, for example by 100 mbar, than in the cathode portion.

In addition, it is possible that in a method according to the present invention the fuel cell system can be operated in an electricity-generating mode for generating electricity as well as in a purging and drying mode for purging and drying the fuel cell system, wherein the steps a), b) and c) are carried out during the purging and drying mode. This means that the method should as far as possible be carried out exclusively in the purging and drying mode and not during the electricity-generating mode of the fuel cell system. In other words, the steps according to the invention are preferably carried out separately from the electricity-generating mode. Thus, the electricity-generating mode remains unaffected. During the purging and drying mode, the fuel cell system can be operated at a minimum load point or at other low load points of the fuel cell system. As soon as both sides in the vehicle are purged, voltage is present in the fuel cell stack. However, since the fuel cell stack is damaged at open circuit voltage (OCV) without current load, it is favourable if at least the minimum load point is approached, i.e. so much current is drawn until the cell voltage has fallen below around 0.85 V DC.

According to a further aspect of the present invention, a fuel cell system is provided comprising a fuel cell stack with an anode portion and a cathode portion, a purge valve downstream of the anode portion for controlling a purge pressure in the anode portion and a back pressure valve downstream of the cathode portion for controlling a back pressure in the cathode portion. The fuel cell system also has a controller with a pressure increase unit for increasing the purge pressure in the anode portion to a predefined purge pressure setpoint with the purge valve closed and for increasing the back pressure in the cathode portion to a predefined back pressure setpoint with the back pressure valve closed, as well as a pressure reduction unit for reducing the increased purge pressure in a pulsed manner, in particular suddenly, as well as the increased back pressure by opening the purge valve and the back pressure valve.

Thus, a fuel cell system according to the invention brings the same advantages as have been described in detail with reference to the method according to the invention. This can be ensured in particular in that the pressure increase unit and the pressure reduction unit are configured and designed to carry out a method as described in detail above.

Furthermore, a computer program product is suggested, within the scope of the invention, which includes commands which, when the computer program product is run by a computer, cause said computer to carry out a method as described above. For this purpose, a storage means with a computer program product according to this embodiment stored thereon is also provided. The storage means can be provided in the form of a controller in which the computer program product is installed. Thus, the computer program product and the storage means likewise bring the advantages described above. The controller can be understood to be a computer, or can include a computer to run the computer program product.

The computer program product can be implemented as computer-readable instruction code in any suitable programming language, for example in JAVA, PYTHON, C++ and/or C#. The computer program product may be stored on a computer-readable storage medium such as a data disk, a removable drive, a volatile or non-volatile memory or a built-in memory/processor. The instruction code can program a computer or other programmable devices such as the controller in such a way that the desired functions are carried out. Furthermore, the computer program product may be provided in a network, such as the internet, from which it can be downloaded by a user if necessary. The computer program product can be realised both by means of a computer program, i.e. as software, as well by means of several special electronic circuits, i.e. as hardware, or in any hybrid form, i.e. by means of software components and hardware components.

Further measures improving the invention are explained in the following description of various exemplary embodiments of the invention, which are represented schematically in the figures.

Figure 2:
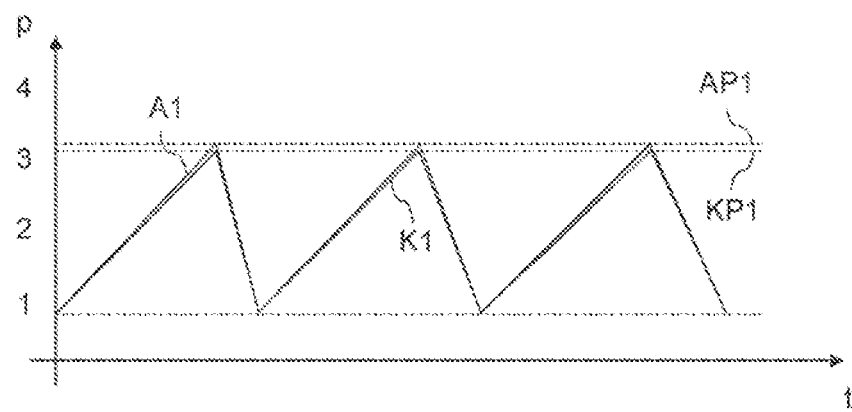
Figure 3:
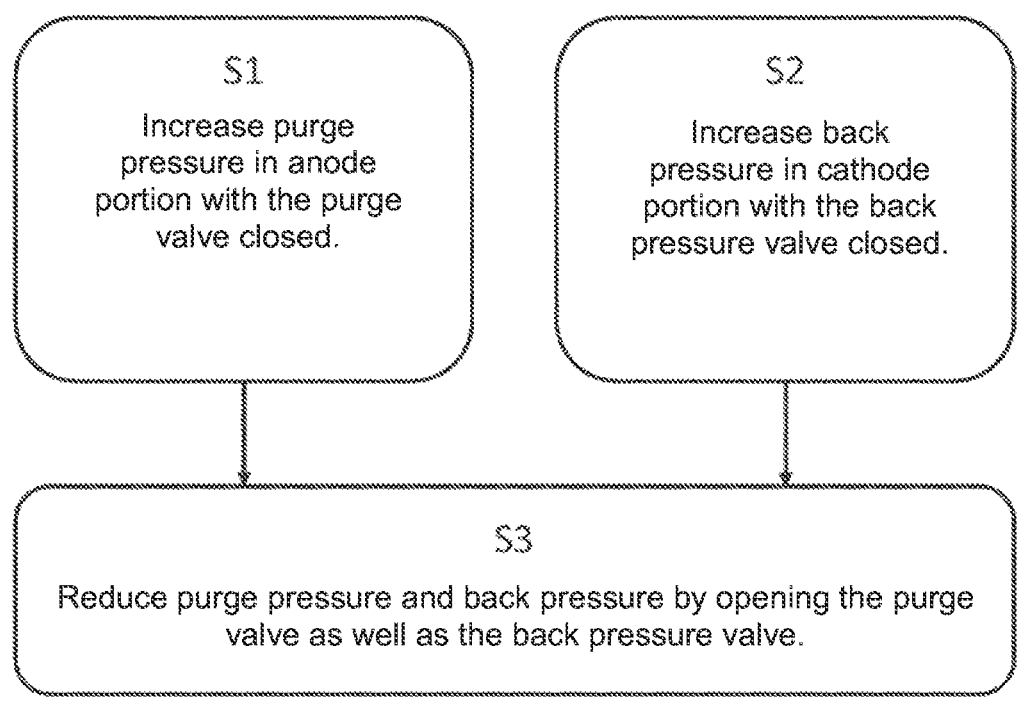

In each case schematically:

FIG. 1 shows a fuel cell system according to a preferred embodiment of the present invention, FIG. 2 shows a diagram serving to explain a method according to the invention, and FIG. 3 shows a flowchart serving to explain a method according to the invention.

A fuel cell system 1 in the form of a PEM system is shown schematically in FIG. 1. The fuel cell system 1 has a fuel cell stack 2 with an anode portion 3, a cathode portion 4 as well as an electrolyte membrane 15 arranged between the anode portion 3 and the cathode portion 4. The fuel cell system 1 also has a purge valve 5 downstream of the anode portion 3 for controlling a purge pressure in the anode portion 3, a back pressure valve 6 downstream of the cathode portion 4 for controlling a back pressure in the cathode portion 4, as well as a controller 7. The controller 7 has a pressure increase unit 8 for increasing the purge pressure in the anode portion 3 to a predefined purge pressure setpoint AP1, shown in FIG. 2, with the purge valve 5 closed, and for increasing the back pressure in the cathode portion 4 to a predefined back pressure setpoint KP1, also shown in FIG. 2, with the back pressure valve 6 closed. In addition, the controller 7 has a pressure reduction unit 9 for reducing the increased purge pressure as well as the increased back pressure in pulses by opening the purge valve 5 and the back pressure valve 6.

The exemplary embodiment shown in FIG. 1 also has a fuel source 11 in the form of a hydrogen tank as well as a control valve 12 for the metered supply of hydrogen to an injector-ejector 13 of the fuel cell system 1. The injector-ejector 13 is arranged upstream of the anode portion 3 to supply fuel to the anode portion 3. Anode exhaust gas in the form of a secondary fluid can be sucked in by the injector-ejector 13 via a recirculation path 16 and supplied in turn to the anode portion 3. Arranged upstream of the cathode portion 4 is a compressor 14 for transporting air to the cathode portion 4 as well as for pressurising the cathode portion 4. In addition to the functional components shown, the fuel cell system 1 may also have further BOP components such as heat exchangers, humidifiers and/or additional switching valves.

The controller 7 has a computer program product 10 installed therein which includes commands which, when the computer program product 10 is run by the controller 7, cause it to carry out a method, as described below, for removing water from a fuel cell system 1 as shown in FIG. 1.

The method is explained below with reference to FIGS. 2 and 3. In a first step S1, the purge pressure in the anode portion 3 is first increased, with the purge valve 5 closed, to a purge pressure setpoint AP1, which according to the illustrated example corresponds to an approximately maximum permitted system pressure of approx. 3 bar.

In a second step S2, the back pressure in the cathode portion 4 is simultaneously increased, with the back pressure valve 6 closed, to a back pressure setpoint KP1, which according to the illustrated example corresponds to an approximately maximum permitted system pressure of, for example, around 3 bar or around 2.5 bar, wherein the back pressure is always kept around 100 mbar lower than the purge pressure. In a third step S3, the purge valve 5 and the back pressure valve 6 are opened to reduce, in a pulsed or abrupt manner, the increased purge pressure as well as the increased back pressure to ambient pressure or approximately ambient pressure. This can be recognised in FIG. 2 from the steep decline of the pressure gradient A1 in the anode portion 3 as well as from the steep decline of the pressure gradient K1 in the cathode portion 4 after reaching the respective maximum setpoint AP1 or KP1. As shown in FIG. 2, the procedure explained in FIG. 3 is repeated twice more, whereby additional repetitions are naturally also possible. The method explained with reference to FIGS. 2 and 3 is carried out during a purging and drying mode of the fuel cell system 1.

In addition to the embodiments described, the invention allows for further design principles. That is to say, the invention should not be considered to be limited to the exemplary embodiments explained with reference to the figures.

LIST OF REFERENCE SIGNS 1 fuel cell system
2 fuel cell stack
3 anode portion
4 cathode portion
5 purge valve
6 back pressure valve
7 controller
8 pressure increase unit
9 pressure reduction unit
10 computer program product
11 fuel source
12 control valve
13 injector-ejector
14 compressor
15 electrolyte membrane
16 recirculation path
A1 pressure gradient in the anode portion
AP1 purge pressure setpoint (maximum purge pressure)
K1 pressure gradient in the cathode portion
KP1 back pressure setpoint (maximum back pressure)

The invention claimed is:

1. The method for removing water from a fuel cell system comprising a fuel cell stack having an anode portion and a cathode portion, a purge valve downstream of the anode portion for controlling a purge pressure in the anode portion, and a back pressure valve downstream of the cathode portion for controlling a back pressure in the cathode portion, comprising the steps:
   a) increasing the purge pressure in the anode portion to a predefined purge pressure setpoint (AP1) with the purge valve closed,
   b) increasing the back pressure in the cathode portion to a predefined back pressure setpoint (KP1) with the back pressure valve closed, and subsequently
   c) reducing the increased purge pressure as well as the increased back pressure in pulses by opening the purge valve and the back pressure valve;
   wherein the fuel cell system is operated in an electricity-generating mode for generating electricity;
   wherein the fuel cell system is operated at a low load point in a purging and drying mode for purging and drying the fuel cell stack, wherein the steps a), b) and c) are carried out during the purging and drying model.

2. The method according to claim 1, wherein the steps a), b) and c) for removing water from the fuel cell system are carried out several times in succession.

3. The method according to claim 1, wherein the purge pressure in the anode portion is increased to a maximum permitted or approximately maximum permitted purge pressure in the anode portion and the back pressure in the cathode portion is increased to the maximum permitted or approximately maximum permitted back pressure in the cathode portion.

4. The method according to claim 1, wherein the purge pressure in the anode portion and the back pressure in the cathode portion are in each case increased to a value between 2 bar and 5 bar.

5. The method according to claim 1, wherein the purge pressure in the anode portion and the back pressure in the cathode portion are increased to the same or approximately the same value.

6. The method according to claim 1, wherein a) and b) are performed using at least one compressor (14) at the low load point.

7. A fuel cell system comprising:
   a fuel cell stack with an anode portion and a cathode portion,
   a purge valve downstream of the anode portion for controlling a purge pressure in the anode portion,
   a back pressure valve downstream of the cathode portion for controlling a back pressure in the cathode portion,
   a controller with a pressure increase unit for increasing the purge pressure in the anode portion to a predefined purge pressure setpoint (AP1) with the purge valve closed and for increasing the back pressure in the cathode portion to a predefined back pressure setpoint (KP1) with the back pressure valve closed, and
   a pressure reduction unit for reducing the increased purge pressure as well as the increased back pressure in pulses by opening the purge valve and the back pressure valve;
   wherein the fuel cell system is operated in an electricity-generating mode for generating electricity;
   wherein the fuel cell system is operated at a low load point in a purging and drying mode for purging and drying the fuel cell stack, wherein the steps a), b) and c) are carried out during the purging and drying model.

8. The fuel cell system according to claim 7, wherein the pressure increase unit and the pressure reduction unit are configured and designed to carry out a method comprising the steps:
   a) increasing the purge pressure in the anode portion to a predefined purge pressure setpoint (AP1) with the purge valve closed,
   b) increasing the back pressure in the cathode portion to a predefined back pressure setpoint (KP1) with the back pressure valve closed, and subsequently
   c) reducing the increased purge pressure as well as the increased back pressure in pulses by opening the purge valve and the back pressure valve.

9. A computer program product comprising commands which, when the computer program product is run by a computer, cause said computer to carry out a method according to claim 1.

10. A non transitory computer program medium with a computer program product according to claim 9 stored thereon.

* * * * *